March 4, 1952   G. E. BURKS ET AL   2,587,693
FILTER
Filed April 17, 1947   2 SHEETS—SHEET 1

INVENTORS.
George E. Burks
BY Ronald R. Robinson
Charles M. Fryer
ATTORNEY.

March 4, 1952  G. E. BURKS ET AL  2,587,693
FILTER
Filed April 17, 1947  2 SHEETS—SHEET 2
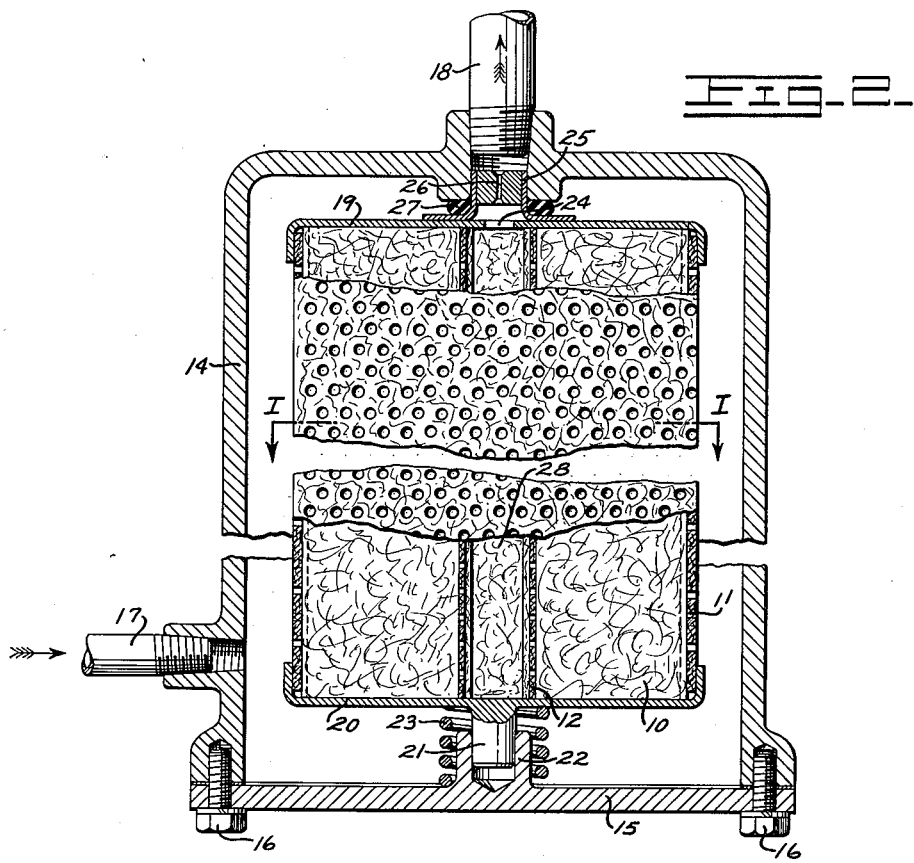
Fig_2_
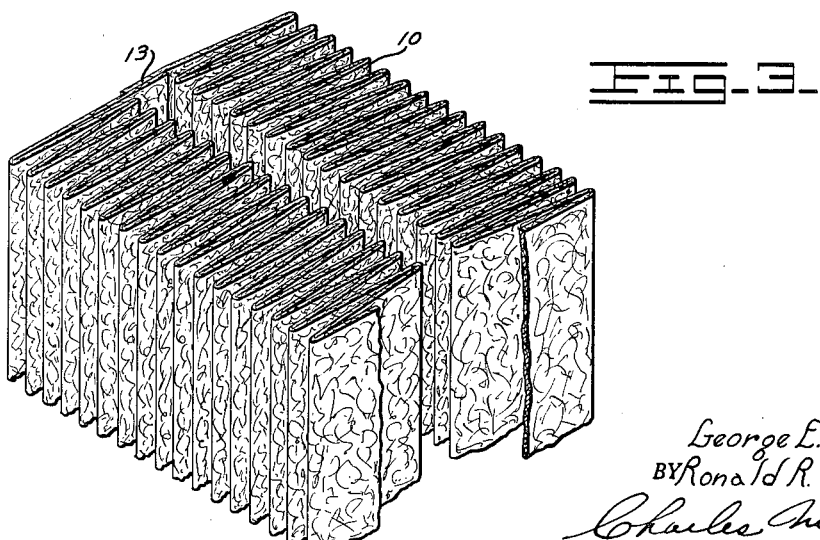
Fig_3_
INVENTORS.
George E. Burks
BY Ronald R. Robinson
Charles M. Fryer
ATTORNEY.

Patented Mar. 4, 1952

2,587,693

UNITED STATES PATENT OFFICE 2,587,693

FILTER

George E. Burks, Peoria, and Ronald R. Robinson, Morton, Ill., assignors to Caterpillar Tractor Co., San Leandro, Calif., a corporation of California Application April 17, 1947, Serial No. 742,092

2 Claims. (Cl. 210—169)

This invention relates to filters and particularly to filters for liquid such as lubricating oil as it is forcibly circulated to lubricated parts of an internal combustion engine. One type of filter in common use employs a paper-like filter medium through which the liquid to be filtered is passed. In order to obtain a large area of filtering surface, the paper is folded back and forth in a zigzag or accordian fold and then arranged within a suitable supporting container with its folded surfaces partially separated to admit oil between them. The conventional container for this purpose is cylindrical and is provided with a perforated cylindrical core. The paper is arranged in the annular space between the core and the container with its flat surfaces between the folds disposed generally radially of the core. In operation, oil admitted to the container through perforations in its outer wall must pass through the filter paper in order to enter the core. Disadvantages of this construction are that due to the radial disposition of the folded paper its folded edges are very closely spaced at the core and too widely spaced at the container wall. This unduly limits the quantity of paper that can be arranged in a given space and also creates a condition under which the folds of paper are too readily forced together by pressure to destroy their efficiency as a filtering medium. It is an object of this invention to provide an improved filter and particularly an improved container for a folded filter medium wherein the capacity for filtering medium is increased and the efficiency of the medium is improved. Further and more specific objects and advantages of the invention are made apparent in the following specification wherein one form of the invention is disclosed for purposes of illustration by reference to the accompanying drawings.

In the drawings:

Fig. 2 is a vertical transverse section through a filter unit container illustrating a filter unit such as is shown in Fig. 1, partially in section and partially in end elevation; and Fig. 3 is a fragmentary perspective view of a portion of the filter medium used in the filter.

Figure 1:
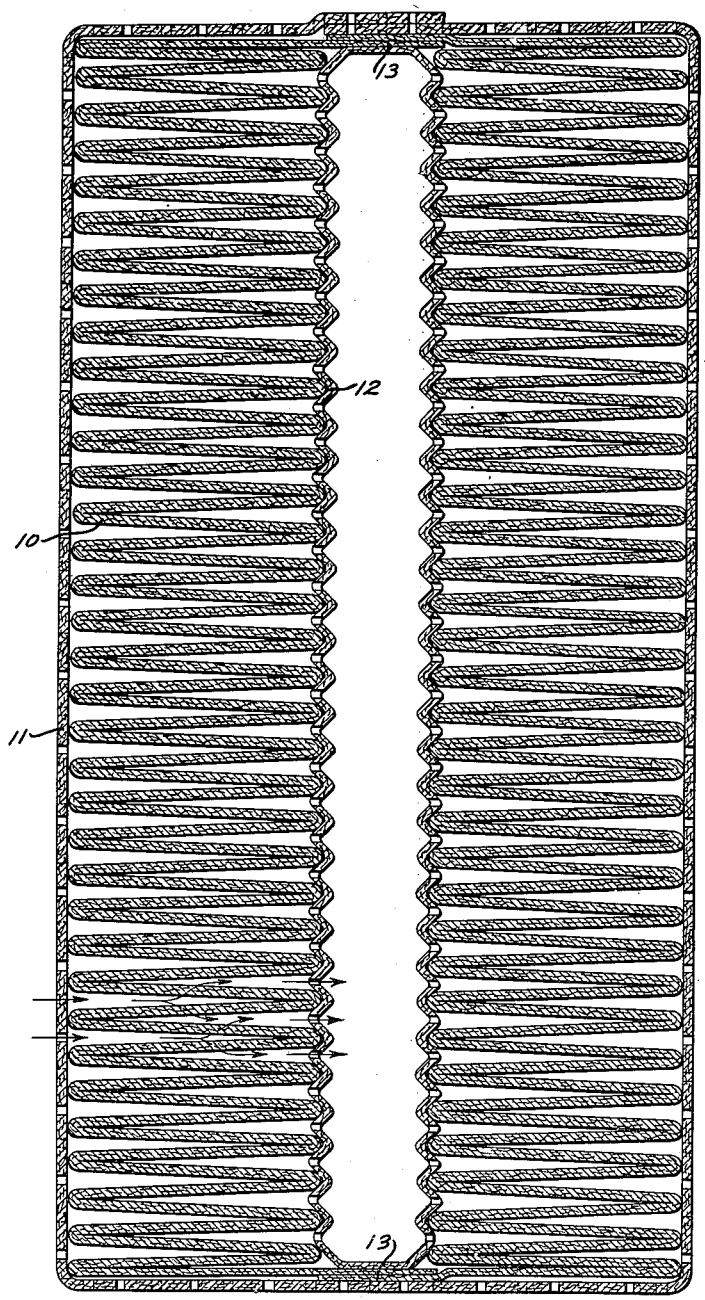
Fig. 1 is a horizonal sectional view through a filter unit embodying the present invention taken on the line I—I of Fig. 2.

The filter unit shown in the drawings comprises folded paper-like filtering medium 10 disposed in a container made up of a perforated outer wall 11 and a corrugated inner wall 12 forming a core for the case. The outer and inner walls 11 and 12 may be made of sheet metal but are preferably, as illustrated, formed of inexpensive and destructible material such as compressed paper or other suitable composition. The core 12 is slightly shorter than the interior of the rectangular outer wall 11 so that two sections of the folded paper-like medium 10 may be joined at their ends as indicated at 13 and the joined portions may be disposed in the spaces between the ends of the core and the ends of the outer wall 11 while the folded portions will be arranged as shown in wider spaces between the sides of the core and sides of the outer wall.

A typical manner of supporting the filter unit is illustrated in Fig. 2 wherein a chamber 14 is shown as having a removable bottom plate 15 secured in place as by screws or the like 16. An inlet pipe 17 communicates with the interior of chamber 14 at one side, and an outlet pipe 18 is disposed centrally of the top thereof. The filter unit is supported between a flanged top plate 19 and a similarly flanged bottom plate 20 disposed within the chamber 14. The bottom plate 20 may include a downwardly extending pilot pin 21 guided for vertical adjustment in a hollow boss 22. A spring 23 surrounding the boss 22 and interposed between the removable bottom plate 15 and the unit supporting plate 20 urges the plate 20 upwardly to retain the filter unit in position against the flanged top plate 19. The top plate 19 is perforated as at 24 and has a fitting 25 with a restricted orifice 26 disposed for reception in the discharge opening which receives the pipe 18. A resilient gasket 27 may be employed to form a seal at this connection.

In operation, oil or other liquid to be filtered entering the chamber 14 through the inlet 17 passes through the perforations of the outer wall 11 of the filter unit as indicated by arrows in Fig. 1, then upon seeping through the separated layers of the filtered medium 10 is free to pass through the perforations of the corrugated core 12 and to pass upwardly within said core to be discharged through the opening 24 and the discharge pipe 18. The interior of the core may be entirely unobstructed as illustrated in Fig. 1 or may contain additional filtering material in the form of cotton waste or the like as indicated at 28 in Fig. 2.

The principal manner in which the filter unit of this invention distinguishes from conventional units employing folded paper-like filtering medium is in the rectangular construction of the container 11 and the inner core member 12. It has previously been the practice to provide a circular or tubular core surrounded by a similar but larger container. Thus, when the folded paper-like medium was arranged within the annular space between the core and the container, the capacity for folded filter medium was considerably less for a unit of a given size than with the construction of the present invention. Because of the fact that the core of the filter unit was tubular, the several folds of the paper-like medium projected radially with a relatively large space between their outer end and were closely clamped or crowded adjacent their inner ends even though their core was corrugated to insure spacing of the inner ends. The present invention in providing greater capacity for filter medium reduces the necessity for frequently changing the medium as it becomes impregnated with the filtrate and also effects a reduction in the unit area pressure exerted against the medium thus reducing the tendency of the individual folds to collapse and lower the capacity of the unit.

The terms "paper" and "paper-like material" as used throughout the specification and claims are to be taken as referring to any flat filter medium capable of being folded but insufficiently rigid or stiff to sustain the pressures of fluids being filtered without mechanical support.

We claim:

1. A filter unit adapted for insertion in a filter casing having inlet and outlet openings, said filter unit comprising a perforate outer wall including opposing end and side wall portions and being open in the top and bottom, impervious top and bottom plates secured to said outer wall closing the open top and bottom thereof, a perforate core spaced inwardly of said side wall portions and in communication with the outlet of the casing through an opening formed centrally of said top plate so as to conduct filtrate away from the unit, a pair of filter sections disposed in the spaces between the core and the side wall portions, each of said sections being formed of sheet filter paper folded about axes perpendicular to said top and bottom plates to accordion-like form, the upper and lower edges of said filter sections abutting said top and bottom plates to prevent flow therearound and cause flow from the casing inlet through the perforate outer wall to pass through the filter sections and thence through the core to the outlet of the casing, the folds of said sections nearest the core being in abutment therewith, and said core being vertically corrugated and formed of relatively stiff material with said folds in abutment therewith individually co-operating with the corrugations of said core for separating and maintaining the individual folds of the filter sections in preselected longitudinal relationship.

2. A filter unit adapted for insertion in a filter casing having inlet and outlet openings, said filter unit comprising a perforate outer wall including opposing end and side wall portions and being open at the top and bottom, impervious top and bottom plates having peripheral flanges secured to said outer wall closing the open top and bottom thereof, a perforate core spaced inwardly of said side wall portions and in communication with the outlet of the casing through an opening formed centrally of said top plate so as to conduct filtrate away from the unit, a pair of filter sections disposed in the spaces between the core and the side wall portions, each of said sections being formed of sheet filter paper folded about axes perpendicular to said top and bottom plates to accordion-like form, the upper and lower edges of said filter sections abutting said top and bottom plates to prevent flow therearound and cause flow from the casing inlet through the perforate outer wall to pass through the filter sections and thence through the core to the outlet of the casing, the folds of said sections nearest the core being in abutment therewith, the ends of said filter sections and core being secured together and said core being vertically corrugated and formed of relatively stiff material with said folds in abutment therewith individually co-operating with the corrugations of said core for separating and maintaining the individual folds of the filter sections in preselected longitudinal relationship.

GEORGE E. BURKS.
RONALD R. ROBINSON.

REFERENCES CITED

The following references are of record in the file of this patent:

UNITED STATES PATENTS

| Number | Name | Date |
|---|---|---|
| 1,677,892 | Herbert et al. | July 24, 1928 |
| 2,218,800 | Williams | Oct. 22, 1940 |
| 2,239,868 | Williams | Apr. 29, 1941 |
| 2,372,865 | Taylor | Apr. 3, 1945 |
| 2,569,243 | Kovacs | Sept. 25, 1951 |

FOREIGN PATENTS

| Number | Country | Date |
|---|---|---|
| 401,287 | Great Britain | Oct. 30, 1933 |
| 489,860 | Great Britain | Aug. 4, 1948 |
| 512,972 | Great Britain | Sept. 29, 1939 |
| 886,736 | France | July 12, 1943 |